US012646223B2

(12) United States Patent
Nguyen Canh et al.

(10) Patent No.: US 12,646,223 B2
(45) Date of Patent: Jun. 2, 2026

(54) OPTIMAL SUB-MESH ENCODING ORDER FOR INITIAL VERTEX SELECTION IN POSITION CODING

(71) Applicant: TENCENT AMERICA LLC, Palo Alto, CA (US)

(72) Inventors: Thuong Nguyen Canh, Palo Alto, CA (US); Xiaozhong Xu, Palo Alto, CA (US); Chao Huang, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 85 days.

(21) Appl. No.: 18/781,135

(22) Filed: Jul. 23, 2024

(65) Prior Publication Data

US 2025/0037320 A1 Jan. 30, 2025

Related U.S. Application Data

(60) Provisional application No. 63/528,636, filed on Jul. 24, 2023, provisional application No. 63/528,635, filed on Jul. 24, 2023.

(51) Int. Cl.
*G06T 9/00* (2006.01)

(52) U.S. Cl.
CPC .................................... *G06T 9/001* (2013.01)

(58) Field of Classification Search
None
See application file for complete search history.

(56) References Cited

U.S. PATENT DOCUMENTS

| | | | |
|---|---|---|---|
| 2021/0217203 A1 | 7/2021 | Kim et al. | |
| 2023/0105452 A1 | 4/2023 | Zhang et al. | |
| 2024/0292028 A1 * | 8/2024 | Tian ....................... | H04N 19/70 |
| 2024/0331204 A1 * | 10/2024 | Kadam ..................... | G06T 3/60 |
| 2025/0008157 A1 * | 1/2025 | Huang .................... | G06T 17/20 |
| 2025/0022182 A1 * | 1/2025 | Kim ..................... | H04N 19/597 |
| 2025/0024057 A1 * | 1/2025 | Nguyen Canh ........ | H04N 19/44 |

FOREIGN PATENT DOCUMENTS

| | | |
|---|---|---|
| GB | 2551387 A | 12/2017 |
| GB | 2561824 A | 10/2018 |

OTHER PUBLICATIONS

International Search Report dated Oct. 8, 2024 in Application No. PCT/US24/39248.
Written Opinion of the International Searching Authority dated Oct. 8, 2024 in Application No. PCT/US24/39248.

* cited by examiner

*Primary Examiner* — Nurun Flora
(74) *Attorney, Agent, or Firm* — Sughrue Mion, PLLC

(57) ABSTRACT

A method and apparatus comprising computer code for mesh attribute coding using a dual degree encoder or decoder configured to cause a processor or processors to receive at least two sub-meshes and determine a pair of vertices with a minimum cost for prediction, wherein a first vertex of the pair of vertices is a part of the first sub-mesh, wherein a second vertex of the pair of vertices is a part of the second sub-mesh. The method may cause a processor or processors to set the first vertex of the pair of vertices as a predictor vertex to the second sub-mesh to be encoded. The method may cause a processor or processors to encode the second sub-mesh in a first encoding order, wherein the second vertex of the pair of vertices is encoded first in the second sub-mesh.

20 Claims, 10 Drawing Sheets

<u>400</u>

400

450

500

550

600

700

705 — Receive At Least Two Sub-meshes

710 — Determine A Pair Of Vertices With A Minimum Cost For Prediction

715 — Set A First Vertex Of The Pair Of Vertices As A Predictor Vertex To A Second Sub-Mesh To Be Encoded With the First Sub-Mesh is Previously Encoded 720 — Signal The First Vertex Of The Pair Of Vertices To A Dual Degree Decoder

FIG. 8

OPTIMAL SUB-MESH ENCODING ORDER FOR INITIAL VERTEX SELECTION IN POSITION CODING

CROSS REFERENCE TO RELATED APPLICATION

The present application claims priority to U.S. Provisional Application Nos. 63/528,635 and 63/528,636 filed on Jul. 24, 2023, the disclosures of which are incorporated herein in their entireties.

FIELD

Embodiments of this disclosure are directed to video coding and decoding. Specifically, embodiments of the present disclosure are to encoding and decoding multiple sub-meshes including position coding in mesh motion vector coding.

BACKGROUND

Advanced three-dimensional (3D) representations of the world are enabling more immersive forms of interaction and communication. To achieve realism in 3D representations, 3D models are becoming ever more sophisticated, and a significant amount of data is linked to the creation and consumption of these 3D models. 3D meshes are widely used to 3D model immersive content.

A 3D mesh may include several polygons that describe the surface of a volumetric object. A dynamic mesh sequence may require a large amount of data since it may have a significant amount of information changing over time. Therefore, efficient compression technologies are required to store and transmit such contents.

While mesh compression standards IC, MESHGRID, FAMC were previously developed to address dynamic meshes with constant connectivity and time varying geometry and vertex attributes. However, these standards do not take into account time varying attribute maps and connectivity information.

Furthermore, it is also challenging for volumetric acquisition techniques to generate a constant connectivity dynamic mesh, especially under real time constraints. This type of dynamic mesh content is not supported by the existing standards.

As another example, glTF (GL Transmission Format) is standard being developed from the Khronos Group for the efficient transmission and loading of 3D scenes and models by applications. glTF aims to minimize both the size of 3D assets, and the runtime processing needed to unpack. A geometry compression extension to glTF 2.0 using Google Draco technology is being developed to reduce the size of glTF models and scenes.

SUMMARY

According to an embodiment, a method, an apparatus, and a non-transitory medium may be provided for mesh attribute coding using a dual degree encoder. The method may include receiving at least two sub-meshes, wherein a first sub-mesh of the at least two sub-meshes is already encoded, and wherein a second sub-mesh of the at least two sub-meshes is to be encoded; determining a pair of vertices with a minimum cost for prediction, wherein a first vertex of the pair of vertices is a part of the first sub-mesh, wherein a second vertex of the pair of vertices is a part of the second sub-mesh; and setting the first vertex of the pair of vertices as a predictor vertex to the second sub-mesh to be encoded; signaling the first vertex of the pair of vertices to a dual degree decoder; and encoding the second sub-mesh in a first encoding order, wherein the second vertex of the pair of vertices is encoded first in the second sub-mesh.

According to an embodiment, a method, an apparatus, and a non-transitory medium may be provided for mesh attribute coding using a dual degree decoder. The apparatus for mesh attribute coding using a dual degree decoder may include at least one memory configured to store program code; and at least one processor configured to read the program code and operate as instructed by the program code. The program code may include first receiving code configured to cause the at least one processor to receive at least two encoded sub-meshes; second receiving code configured to cause the at least one processor to receive a predictor vertex from a dual degree encoder, wherein the predictor vertex is a first vertex of a pair of vertices with a minimum cost for prediction; first determining code configured to cause the at least one processor to determine a second vertex based on the predictor vertex, wherein the first vertex of the pair of vertices is a part of a first sub-mesh among the at least two encoded sub-meshes, wherein the second vertex of the pair of vertices is a part of a second sub-mesh of the at least two encoded sub-meshes; and first decoding code configured to cause the at least one processor to decode the second sub-mesh subsequent to decoding the first sub-mesh using the second vertex of the pair of vertices.

According to an embodiment, a method, an apparatus, and a non-transitory medium may be provided for mesh attribute coding. The non-transitory computer-readable medium storing instructions may include one or more instructions that, when executed by one or more processors of a device for mesh attribute coding, cause the one or more processors to perform a conversion between a visual media file and a bitstream of a visual media data according to a format rule, wherein the bitstream comprises at least two sub-meshes, a first sub-mesh of the at least two sub-meshes already converted, wherein the bitstream comprises a predictor vertex to a second sub-mesh to be converted, wherein the predictor vertex is a first vertex of a pair of vertices with a minimum cost for prediction, wherein the first vertex of the pair of vertices is a part of the first sub-mesh among the at least two sub-meshes, wherein a second vertex of the pair of vertices is a part of the second sub-mesh of the at least two sub-meshes; and encoding or decoding the second sub-mesh using the second vertex of the pair of vertices.

BRIEF DESCRIPTION OF THE DRAWINGS

Further features, nature, and various advantages of the disclosed subject matter will be more apparent from the following detailed description and the accompanying drawings in which:

FIG. 8 is an exemplary diagram of a computer system suitable for implementing embodiments.

DETAILED DESCRIPTION

The proposed features discussed below may be used separately or combined in any order. Further, the embodiments may be implemented by processing circuitry (e.g., one or more processors or one or more integrated circuits). In one example, the one or more processors execute a program that is stored in a non-transitory computer-readable medium.

Figure 1:
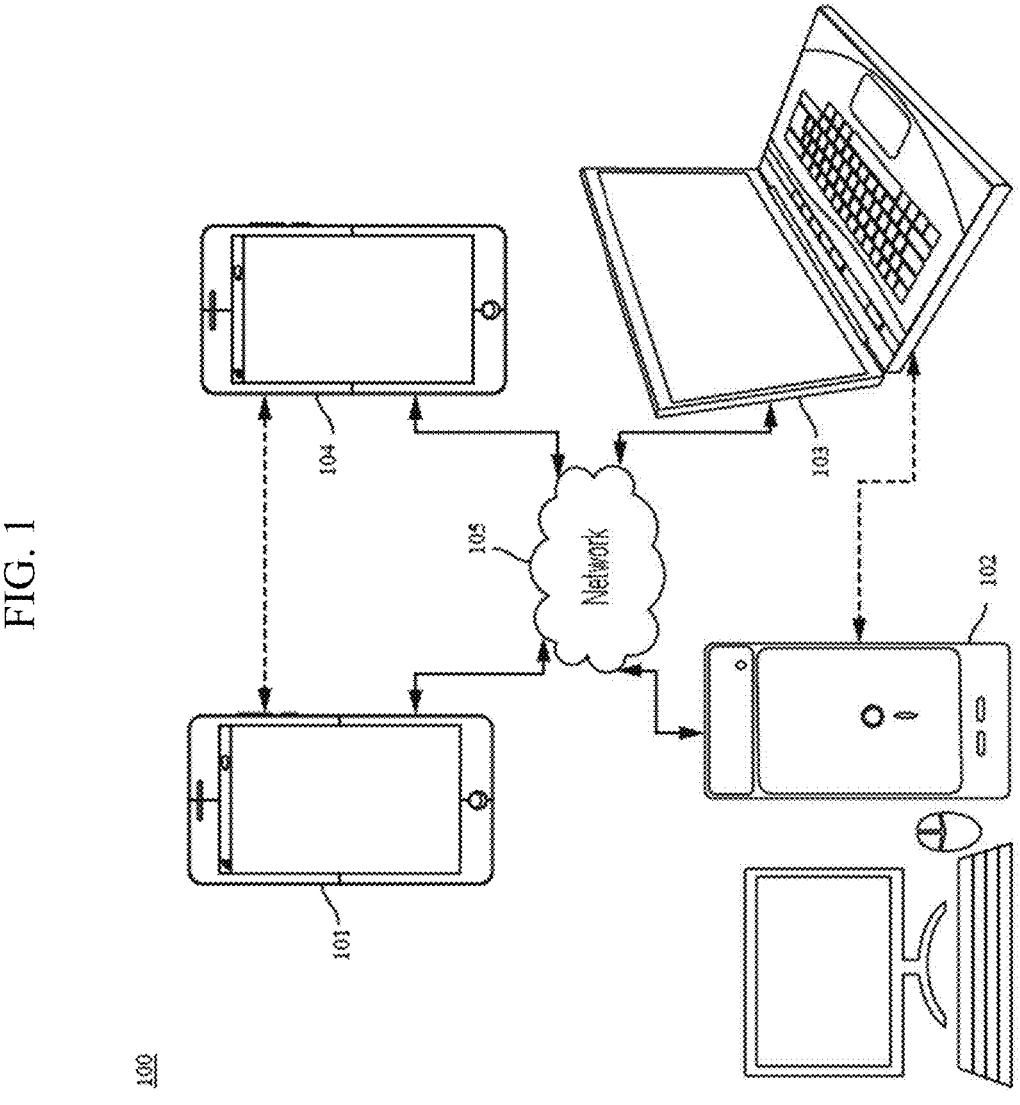
FIG. 1 is a schematic illustration of a simplified block diagram of a communication system, in accordance with embodiments of the present disclosure.

FIG. 1 illustrates a simplified block diagram of a communication system 100 according to an embodiment of the present disclosure. The communication system 100 may include at least two terminals 102 and 103 interconnected via a network 105. For unidirectional transmission of data, a first terminal 103 may code video data at a local location for transmission to the other terminal 102 via the network 105. The second terminal 102 may receive the coded video data of the other terminal from the network 105, decode the coded data and display the recovered video data. Unidirectional data transmission may be common in media serving applications and the like.

FIG. 1 illustrates a second pair of terminals 101 and 104 provided to support bidirectional transmission of coded video that may occur, for example, during videoconferencing. For bidirectional transmission of data, each terminal 101 and 104 may code video data captured at a local location for transmission to the other terminal via the network 105. Each terminal 101 and 104 also may receive the coded video data transmitted by the other terminal, may decode the coded data and may display the recovered video data at a local display device.

In FIG. 1, the terminals 101, 102, 103 and 104 may be illustrated as servers, personal computers and smart phones but the principles of the present disclosure are not so limited. Embodiments of the present disclosure find application with laptop computers, tablet computers, media players and/or dedicated video conferencing equipment. The network 105 represents any number of networks that convey coded video data among the terminals 101, 102, 103 and 104, including for example wireline and/or wireless communication networks. The communication network 105 may exchange data in circuit-switched and/or packet-switched channels. Representative networks include telecommunications networks, local area networks, wide area networks and/or the Internet. For the purposes of the present discussion, the architecture and topology of the network 105 may be immaterial to the operation of the present disclosure unless explained herein below.

Figure 2:
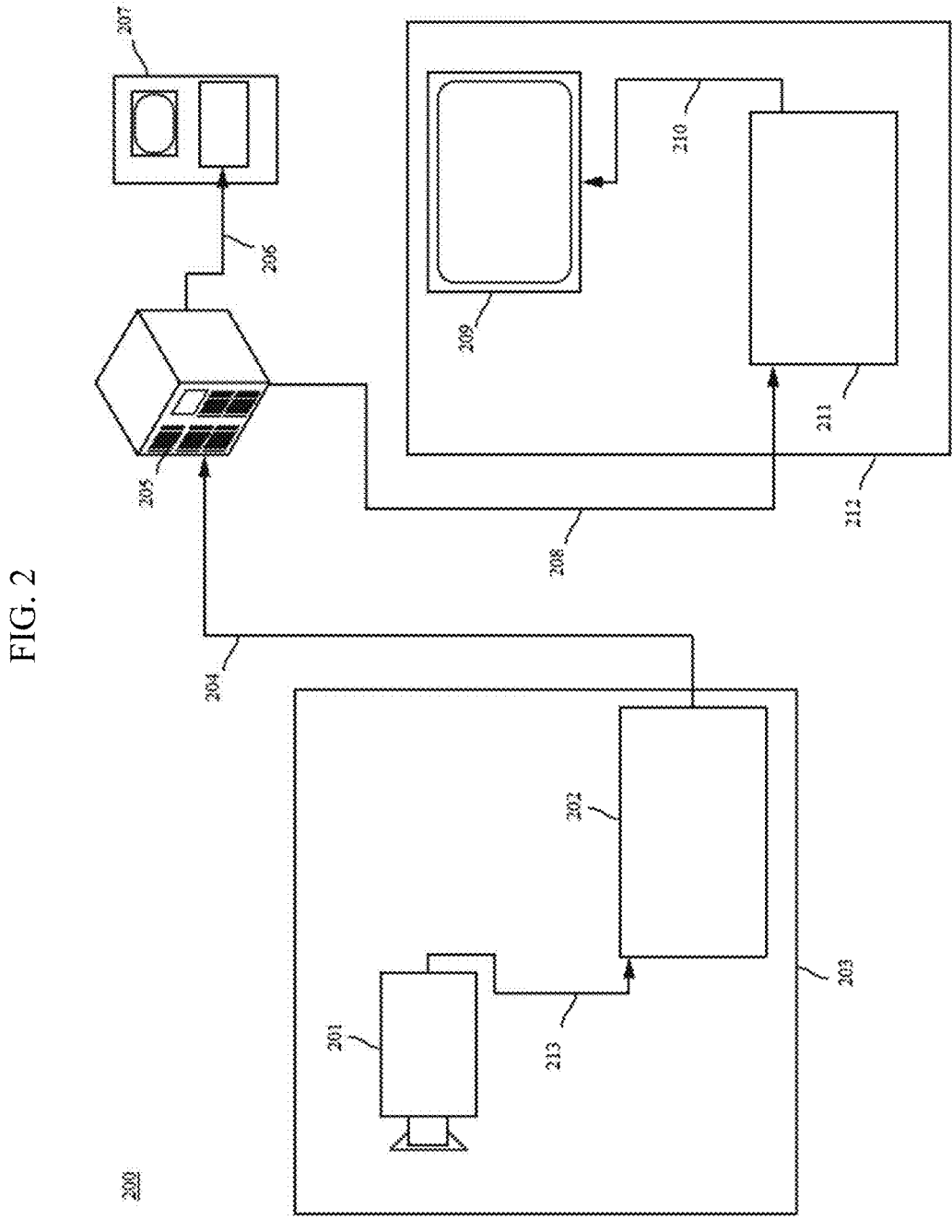
FIG. 2 is a schematic illustration of a simplified block diagram of a streaming system, in accordance with embodiments of the present disclosure.

FIG. 2 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem 203, that can include a video source 201, for example a digital camera, creating, for example, an uncompressed video sample stream 213. That sample stream 213 may be emphasized as a high data volume when compared to encoded video bitstreams and can be processed by an encoder 202 coupled to the video source 201, which may be for example a camera as discussed above. The encoder 202 can include hardware, software, or a combination thereof to enable or implement aspects of the disclosed subject matter as described in more detail below. The encoded video bitstream 204, which may be emphasized as a lower data volume when compared to the sample stream, can be stored on a streaming server 205 for future use. One or more streaming clients 212 and 207 can access the streaming server 205 to retrieve copies 208 and 206 of the encoded video bitstream 204. A client 212 can include a video decoder 211 which decodes the incoming copy of the encoded video bitstream 208 and creates an outgoing video sample stream 210 that can be rendered on a display 209 or other rendering device (not depicted). In some streaming systems, the video bitstreams 204, 206 and 208 can be encoded according to certain video coding/compression standards. Examples of those standards are noted above and described further herein.

According to exemplary embodiments further described below, the term "mesh" indicates a composition of one or more polygons that describe the surface of a volumetric object. Each polygon is defined by its vertices in 3D space and the information of how the vertices are connected, referred to as connectivity information. Optionally, vertex attributes, such as colors, normals, etc., could be associated with the mesh vertices. Attributes could also be associated with the surface of the mesh by exploiting mapping information that parameterizes the mesh with 2D attribute maps. Such mapping may be described by a set of parametric coordinates, referred to as UV coordinates or texture coordinates, associated with the mesh vertices. 2D attribute maps are used to store high resolution attribute information such as texture, normals, displacements etc. Such information could be used for various purposes such as texture mapping and shading according to exemplary embodiments.

Nonetheless, a dynamic mesh sequence may require a large amount of data since it may consist of a significant amount of information changing over time. For example, in contrast to a "static mesh", or "static mesh sequence," in which information of that mesh may not change from one frame to another, a "dynamic mesh", or a "dynamic mesh sequence", indicates motion in which ones of vertices represented by that mesh change from one frame to another. Therefore, efficient compression technologies are required to store and transmit such contents. Mesh compression standards IC, MESHGRID, FAMC were previously developed by MPEG to address dynamic meshes with constant connectivity and time varying geometry and vertex attributes. However, these standards do not take into account time varying attribute maps and connectivity information. DCC (Digital Content Creation) tools usually generate such dynamic meshes. In counterpart, it is challenging for volumetric acquisition techniques to generate a constant connectivity dynamic mesh, especially under real time constraints. This type of contents is not supported by the existing standards. According to exemplary embodiments herein, there is described aspects of a new mesh compression standards to directly handle dynamic meshes with time varying connectivity information and optionally time varying attribute maps, this standard targets lossy, and lossless compression for various applications, such as real-time communications, storage, free viewpoint video, AR and VR. Functionalities such as random access and scalable/progressive coding are also considered.

Figure 3:
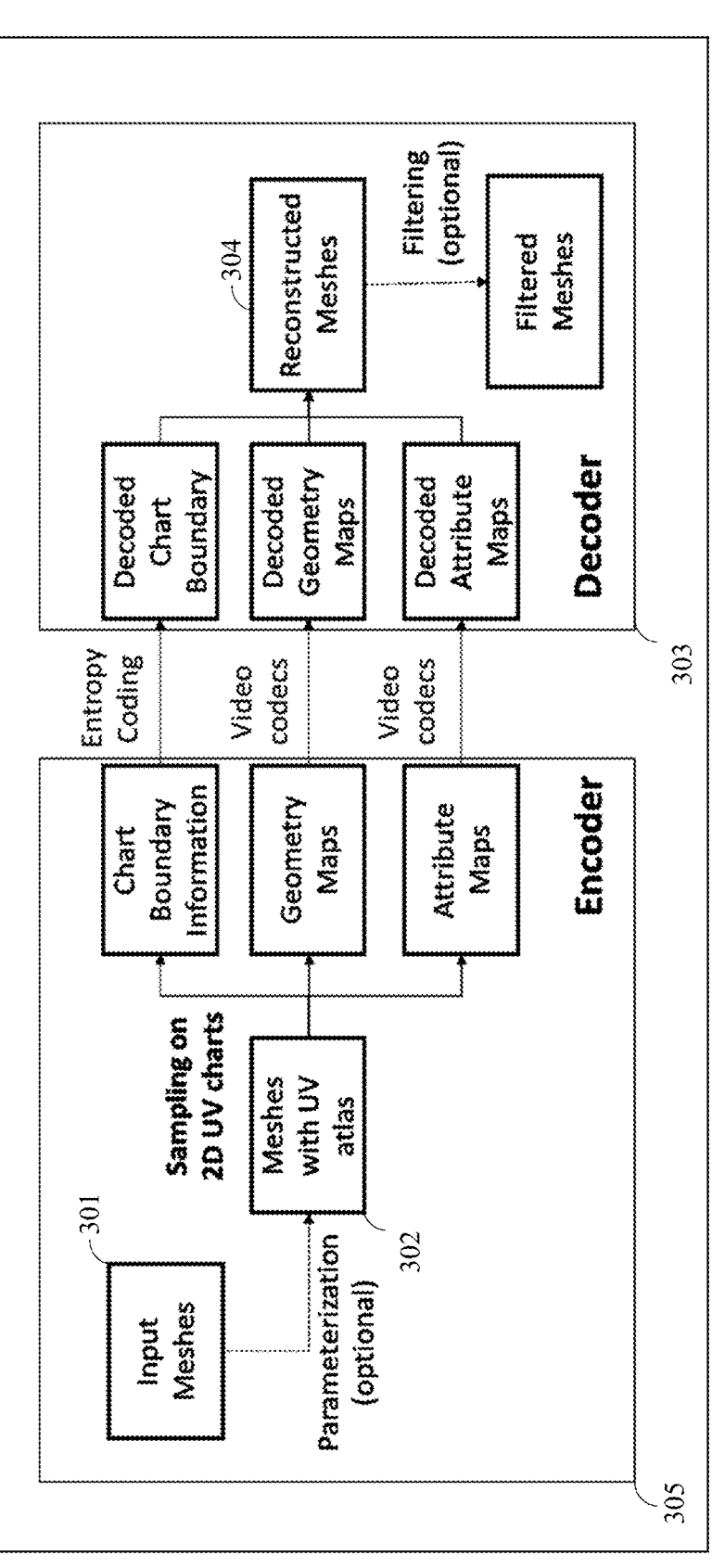
FIG. 3 is a schematic illustration of a simplified block diagram of a video encoder and decoder, in accordance with embodiments of the present disclosure.

FIG. 3 represents an example framework 300 of dynamic mesh compression such as for a 2D atlas sampling based method. Each frame of the input meshes 301 can be preprocessed by a series of operations, e.g., tracking, remeshing, parameterization, voxelization. Note that, these operations can be encoder-only, meaning they might not be part of the decoding process and such possibility may be signaled in metadata by a flag such as indicating 0 for encoder only and 1 for other. After that, one can get the meshes with 2D UV atlases 302, where each vertex of the mesh has one or more associated UV coordinates on the 2D atlas. Then, the meshes can be converted to multiple maps, including the geometry maps and attribute maps, by sampling on the 2D atlas. Then these 2D maps can be coded by video/image codecs, such as HEVC, VVC, AV1, AVS3, etc. On the decoder 303 side, the meshes can be reconstructed from the decoded 2D maps. Any post-processing and filtering can also be applied on the reconstructed meshes 304. Note that other metadata might be signaled to the decoder side for the purpose of 3D mesh reconstruction. Note that the chart boundary information, including the uv and xyz coordinates, of the boundary vertices can be predicted, quantized and entropy coded in the bitstream. The quantization step size can be configured in the encoder side to tradeoff between the quality and the bitrates.

In some implementations, a 3D mesh can be partitioned into several segments (or patches/charts), one or more 3D mesh segments may be considered to be a "3D mesh" according to exemplary embodiments. Each segment is composed of a set of connected vertices associated with their geometry, attribute, and connectivity information.

Dual Degree mesh coding is a specialized technique aimed at efficiently encoding and decoding the connectivity of polygon meshes. Through the principle of duality, dual degree mesh coding enables encoding and decoding connectivity data of sub-meshes by constructing two separate sequences: one characterizing the valence of vertices and the other depicting the degrees of faces.

Figure 4A:
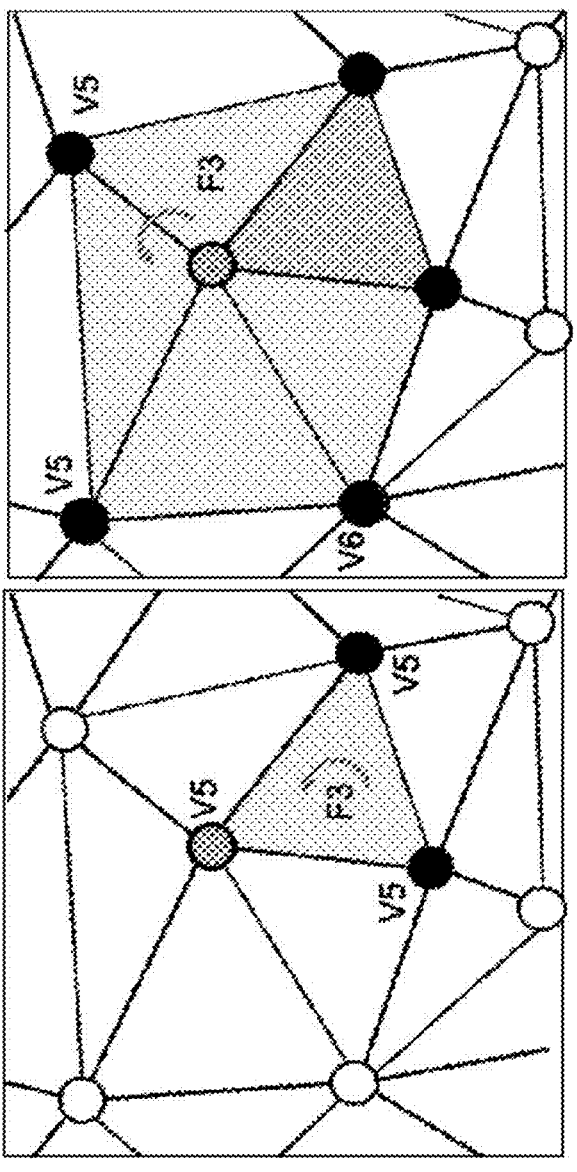
FIG. 4A is a schematic illustration of a dual degree traversal, in accordance with embodiments of the present disclosure.

FIG. 4A is a diagram 400 illustrating a dual degree traversal, in accordance with embodiments of the present disclosure.

As shown in diagram 400, the encoding process involves simultaneous traversal around both the faces and vertices. Specifically, the traversal commences with an arbitrary seed face, from which the degree of the face is recorded. Subsequently, the valences of the adjacent vertices are also noted as VERTEX symbol of valence 5, e.g. V5. Then, what is termed a 'pivot' vertex, is identified by possessing the minimum degree of freedom—signifying the count of its adjacent faces that have not been traversed. The traversal continues around this pivot vertex, appending new faces and vertices and recording their respective degrees. The performance of the Dual Degree coding is largely contingent on the regularity of face degrees and vertex valences.

Attributes of mesh includes vertex position, texture coordinate, normal vector, associated texture map. Geometric attribute like vertex position is encoded follow the traversal order and implement predictive coding scheme. That is, a residual vector between the current position and predicted position are encoded to the bitstream as:

$$r = v - p. \qquad \text{Eqn 1}$$

Figure 4B:
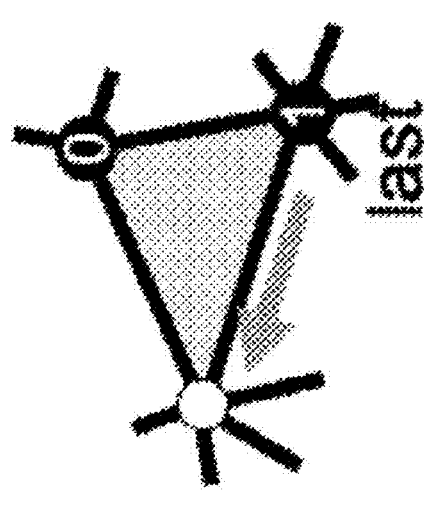
FIG. 4B is a schematic illustration of prediction of a first three positions, in accordance with embodiments of the present disclosure.
Figure 4B:
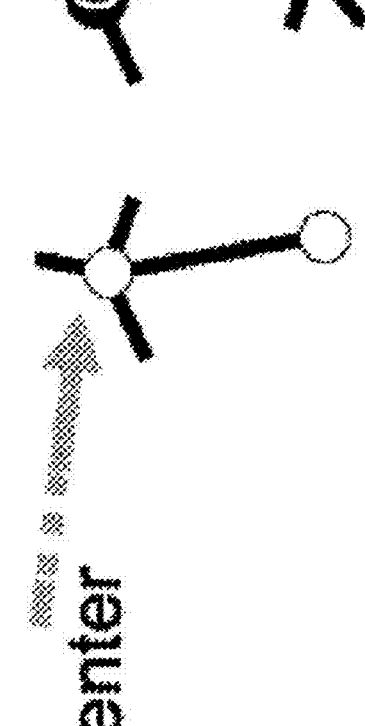

FIG. 4B is a diagram 450 of a process of prediction first three positions of a mesh, in accordance with embodiments of the present disclosure.

As shown in diagram 450, a parallelogram prediction, which is typically associated with a quadrilateral mesh, is often difficult initially, especially for the first three vertices, these advanced prediction are not available as there is not enough reference vertices, (i.e., at least 3 previous encoded vertex).

For the first position, since there is no reference position, the initial predictor may be center of the input mesh. In embodiments, for quantized mesh, without knowing the bounding box, the initial predictor will use $P_0=(2^{QP-1}, 2^{QP-1}, 2^{QP-1})$ instead. QP denotes the bitdepth for position attribute.

For the second and third positions, the previous reconstructed position $P_{i+1}= \hat{v}_i$ is used as the predictor. Compared to parallelogram predictor, initial and last predictor are often worst and result in large residual vectors.

In practice, a mesh often comprises multiple connected components, e.g., submeshes, resulting from modeling complex mesh from multiple simpler meshes. This modular design is prevalent in both computer generated, and 3D scan meshes. Unfortunately, the position coding often follows the traversal order presents the challenges when encoding the initial vertices for each submesh.

Accordingly, embodiments of the disclosure enables effectively handling prediction for the first three vertices for each connected component. The methods disclosed herein may applied to any position attribute compression algorithm regardless of polygonal structure. The methods disclosed herein are also applicable for all traversal methods by introducing a new vertex symbol.

The methods disclosed herein enable the selection of the best initial vertex for a given connected component, then optimized prediction order for the mesh with multiple connected components. Further, the methods disclosed herein include methods to signal the best prediction mode for the first three vertices of each submesh and optimize an encoding order of submeshes to further reduce the bitrate.

Given two non-connected submeshes Mi and Mj, where Mi is already encoded, and an objective of this disclosure is to find the first position to encoding Mj with its best predictor in Mi. In an embodiment, the minimum cost is the distance between the two nearest vertices belong to each submesh. Assuming the pair of vertices with minimum distortion are $$v_+^i \in Mi$$

and $$v_+^j \in Mj.$$

Then, the strategy according to an embodiment for position coding would be to select $$v_+^j$$

as the initial predictor and $$v_+^j$$

as the first vertex to be encoded.

A plurality of methods may be used to signal the initial predictor. In one embodiment, the signaling of $$v_+^j$$

may be performed via its encoding order in submesh Mi. In a same or another embodiment, the selection of the best predictor vertex may be limited to an offset of n from the last encoded vertex, thus minimizing the bit signaling. However, signaling the index may not be efficient for submeshes with a large number of vertices. While a truncated offset can help decrease the bit overhead, it could also result in a sub-optimal predictor.

According to an embodiment of the present disclosure, another signaling approach may be introducing a new vertex symbol in dual degree coding. A new vertex PRED (but not limited thereto) is introduced next to the vertex to marked it as the predictor for the next submesh. In a worst case, this symbol may appear once for every vertex. Encoding this PRED symbol could be based on the offset based on the nearest distance to the current pivot. The distance could be L1 norm distance or L2 norm distance. As the number of vertices being added for each pivot is relatively small, this significantly reduces the offset value to signaling the last vertex.

In an embodiment, PRED symbol may be inserted after a dual degree traversal only if the cost of having PRED symbol is significantly better than using the last encoded vertex, thus significantly reduce the number of PRED symbols in the bitstream. On the other hand, at decoder side, one can use the last encoded vertex from a previous submesh by default, and only use the vertex with PRED symbol as its predictor, if present.

Approaches in related art handle two submeshes in a greedy manner. However, if there is a larger number of submeshes, the question of the optimal sub mesh encoding order becomes highly relevant. In embodiments, an input mesh may be separated into multiple submeshes, the initial prediction cost between each pair of them may be calculated, and a bi-directional graph may be formed.

Figure 5A:
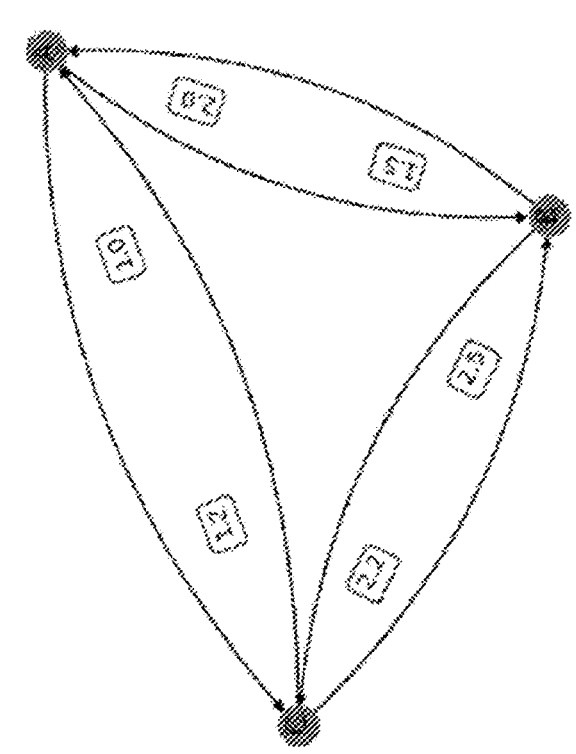
FIG. 5A is an exemplary diagram illustrating a bi-directional graph for a submesh encoding order, in accordance with embodiments of the present disclosure.

FIG. 5A is an exemplary diagram 500 illustrating a bi-directional graph for a submesh encoding order, in accordance with embodiments of the present disclosure.

Each direction in the graph indicates the cost of encoding initial vertices and the cost of signaling PRED symbol. This cost is denoted as Cost(Mi, Mj), which are different in direction Cost(Mi, Mj) #Cost(Mj, Mi), thereby highlighting the importance of optimal encoding order. In one embodiment, an optimized encoding order may be determined as a Hamiltonian Path Problem (HPP) for bi-directional and completed graph as illustrated in diagram 500. The number in diagram 500 for showing the cost for using start submesh as the initial predictor for the target submesh.

Figure 5B:
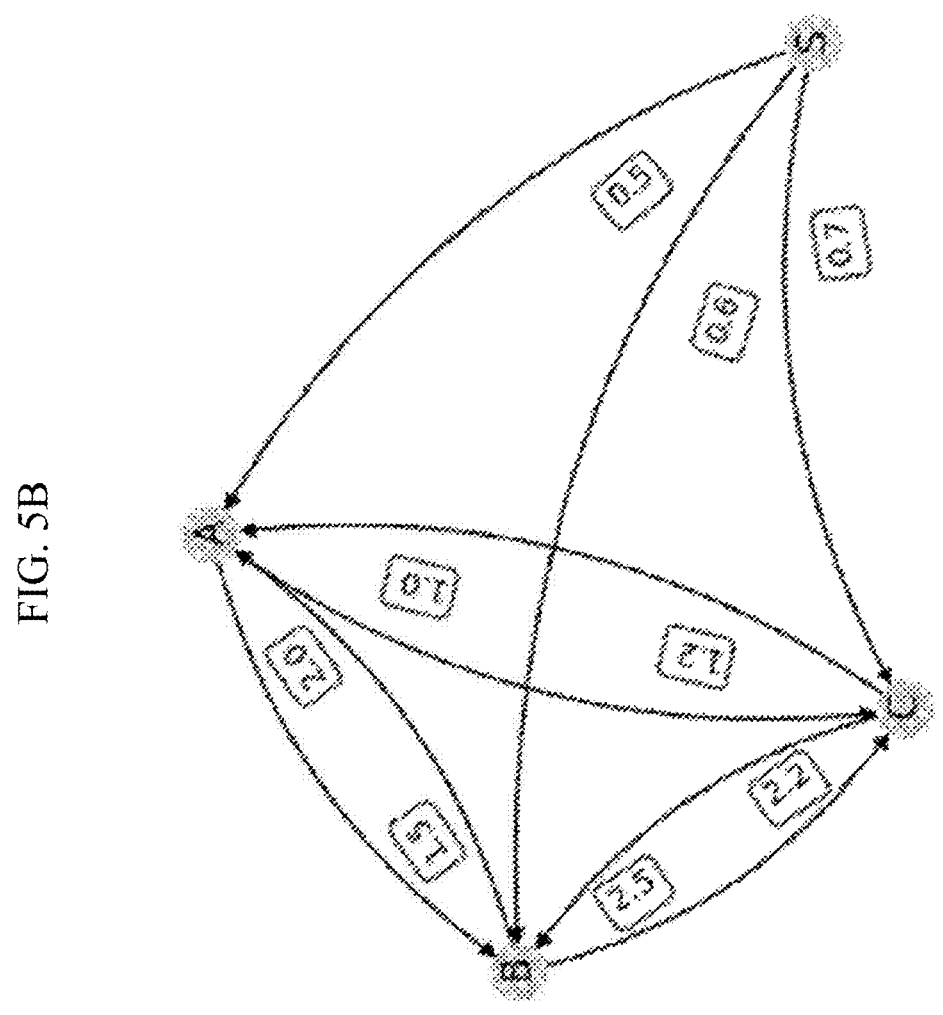
FIG. 5B is an exemplary diagram illustrating a directional graph for a submesh encoding order, in accordance with embodiments of the present disclosure.

In another embodiment, an optimized encoding order may be determined as a Hamiltonian Path Problem (HPP) for incomplete bi-diagonal graph where the start node is the first initial predictor with only forward direction. This approach could be more complex but give higher performance as accounting for the first initial predictor S as illustrated in FIG. 5B.

Cost(Mi, Mj) is the distance between the encoding cost of first three vertices in Mi using nearest vertex in Mj together with the cost of signaling the PRED symbol. However, calculating this cost is computational complex as it is involving comparing many vertices. Therefore, several simplified cost estimation methods are introduced in the present disclosure.

In accordance with the present disclosure, the input mesh may be simplified before performing the search for nearest minimum pair to reduce the complexity. Then, once the order completed, a refined search may be performed to find the minimum distance pair from the two selected submeshes.

In an embodiment, the cost is defined as the distance between the centroids of two selected submeshes, such as:

$$\mathrm{Cost}(M_i, M_j) = |C_i - C_j|, \qquad \text{Eqn 2}$$

In this embodiment, the dynamic graph becomes an "undirected weighted graph which speeds up the optimization algorithm.

In another embodiment, instead of using centroid distance, an axis aligned bounding box is determined, then the minimum distance between two bounding boxes is found. If the bounding boxes overlap, the distance is set to zero. Otherwise, it is the minimum distance between the surface of the bounding boxes of the two submeshes.

In another embodiment, the bounding box difference may be enhanced by incorporating the orientation of the vertices. This may result in a more accurate approximation for the rate estimation.

Figure 6:
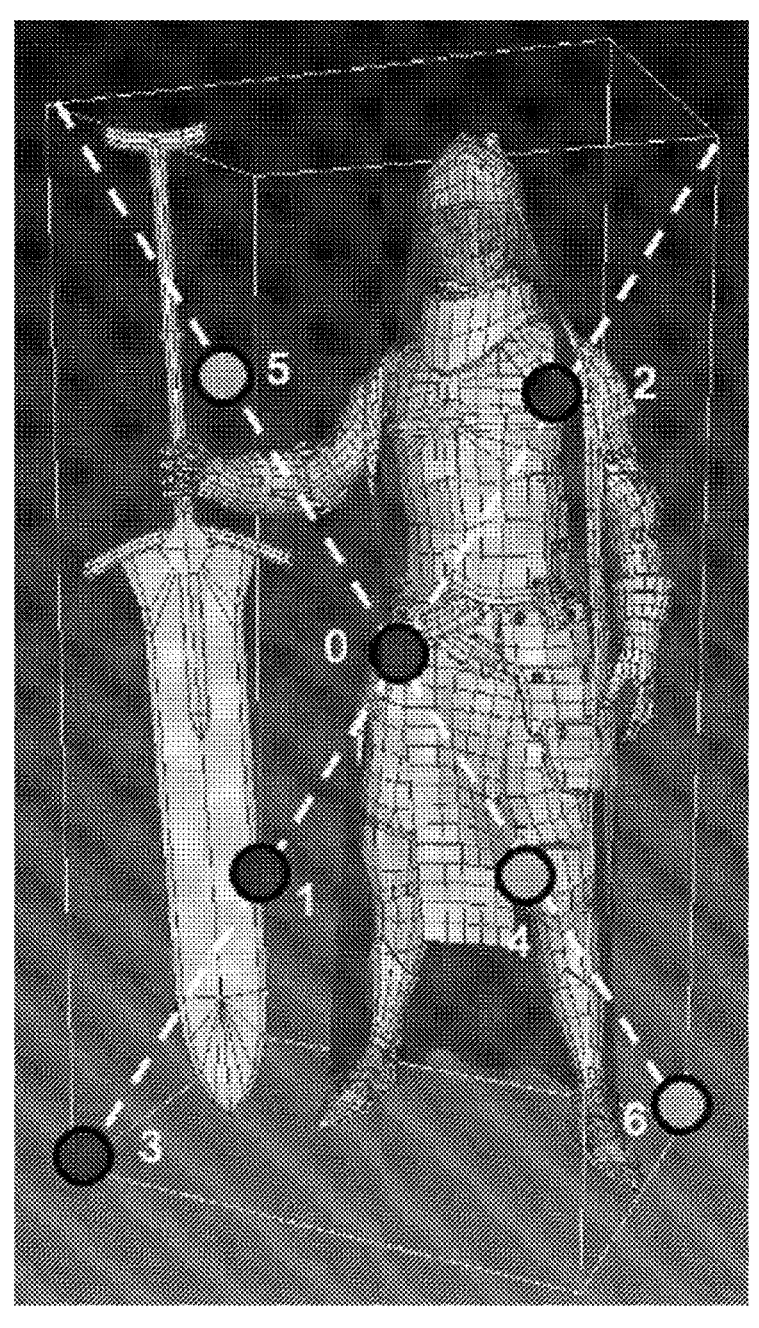
FIG. 6 is an exemplary illustration of positions included in a candidate list, in accordance with embodiments of the present disclosure.

In embodiments mentioned above, the selection of the initial vertex for encoding or decoding may be based on a minimum cost. However, in embodiments, an initial predictor may be determined from a predictor candidate list as a sub-sampling location of the bounding box. The predictors may be pre-determined sub-sampled position within a bounding box as shown in FIG. 6. Depending on the amount of bit b to be used to signal, only predictors with order smaller than $2^b-1$ may be used. In one embodiment, the order of candidate list is given in a priority order. An example priority order may include the order in Table 1.

TABLE 1

| Candidate list for Initial Predictor in priority order for the First Submesh | |
|---|---|
| Order | Point |
| 1 | $(2^{QP-1}, 2^{QP-1}, 2^{QP-1})$ |
| 2 | $(0, 0, 0)$ |
| 3 | $(2^{QP-2}, 2^{QP-2}, 2^{QP-2})$ |
| 4 | $3 * (2^{QP-2}, 2^{QP-2}, 2^{QP-2})$ |
| 5 | . . . |

For each predictor candidate, we find the best vertex position V from the set on un-coded vertex Vu with a minimum cost to the selected predictor $v_p$ as:

$$v = \underset{v_i \in V_u}{\text{argmin}} \ \text{Cost}(r_i) \qquad \text{Eqn 3}$$

$$r_i = v_i - v_p \qquad \text{Eqn 4}$$

In an embodiment, Sum of Absolute Different (SAD) may be used as the cost function. In another embodiment, the rate estimation may be used. In this case, the search space is the number of vertex $n_v$.

In one embodiment, we further include the cost of encoding the second and third vertices as well. That's is, for each vertex Vi, calculate the initial cost to encode it as:

$$\in_{v_i} = \text{Cost}(v_i - v_p) \qquad \text{Eqn 5}$$

Then, for each neighbor face $f_j$ of $v_i$, calculate the cost to encode $$v_{i+1}^j$$

and $$v_{i+2}^j$$

n counter-clockwise order of the face:

$$\in_{v_i} = \in_{v_i} + \text{Cost}(v_{i+1}^j - \hat{v}_i) + \text{Cost}(v_{i+2}^j - \hat{v}_{i+1}^j) \qquad \text{Eqn 6}$$

Where $\hat{v}$ is the reconstructed version of $v$ in case of lossy encoding vertex. It may be written as this formula:

$$v = \qquad \text{Eqn 7}$$

$$\underset{v_i \in V_u}{\text{arg min}} \left( \text{Cost}(v_i - v_p) + \underset{f_j \in F_i}{\text{arg min}} \ \text{Cost}(v_{i+1}^j - v_i) + \text{Cost}(v_{i+2}^j - v_{i+2}^j) \right)$$

Then the best prediction mode for the initial predictor is recorded.

From the second sub-mesh forward, there is additional predictor to choose from, including the centroid of the previously coded submesh (named Vcentroid), the first (Vfirst) and last (Vlast) encoded vertices of the previously coded submesh, the center vertex (vcenter), as well as the previously coded last vertex, the previously k-th to last coded vertex (Vlast-k; k=1, 2). In an embodiment, the candidate list may include candidates defined in Table 2.

TABLE 2

Candidate list for Initial Predictor in priority order for the Remainder Submesh

| Order | Point |
|---|---|
| 1 | $V_{last}$ |
| 2 | $V_{first}$ |
| 3 | $V_{centroid}$ |
| 4 | $V_{center}$ |
| 5 | $V_{last-1}$ |
| . . . | |
| n | $V_{last-k}$. |

According to an embodiment, the mechanism to signal prediction mode for initial vertices prediction. It includes signaling the number of submesh, and prediction mode for each submesh: b(•) stands for bool, i(•) for singed, u(•) for unsigned bits, and S denotes the number of submeshes. In an embodiment, b1 bits may be used to signal a number of submesh, and b2 bits may be used to signal a prediction mode for the first submesh and b3 may be used to signal the remainder submesh. In embodiments, b2 may be larger than b3, as b3 is the poorer predictor.

TABLE 3

Signaling of Initial Prediction Mode

```
Init_predict_params_set( ) {
    mips_is_multiple_submesh                    b(1)
    if (mips_is_multiple_submesh) {
        mips_num_submesh_minus2. /*S-2*/        u(b1)
    }
    mips_init_pred_mode[0]                       u(b2)
    if (mips_is_multiple_submesh) {
        for (i = 0; i < S; ++i) {
            mips_init_pred_mode[i]               u(b3)
        }
    }
}
```

According to an embodiment, only one reference which is deterministic by both
    encoder and decoder may be used so that no signaling is required.

Figure 7:
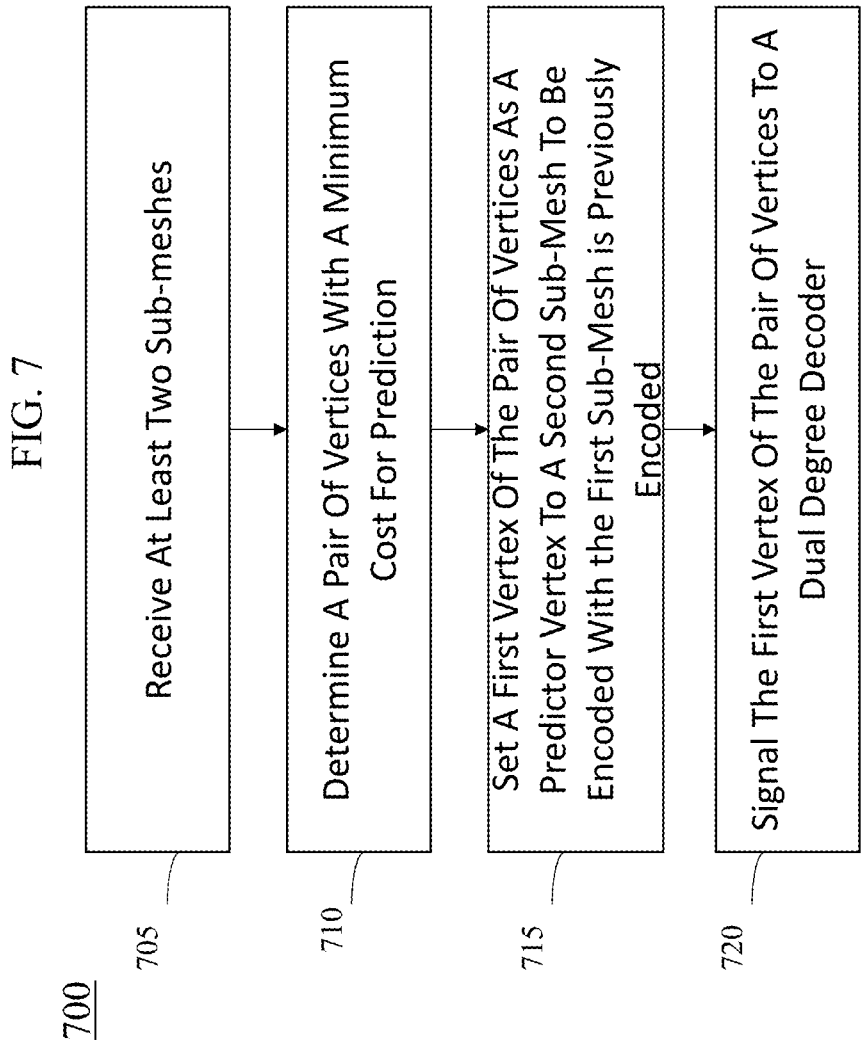
FIG. 7 is an exemplary process for encoding a plurality of meshes using a predictor vertex that belongs to an already encoded mesh, in accordance with embodiments of the present disclosure.

FIG. 7A is an exemplary process 700 for encoding a plurality of meshes using a predictor vertex that belongs to an already encoded mesh, in accordance with embodiments of the present disclosure.

At operation 705, at least two sub-meshes may be received. In embodiments, a first sub-mesh of the at least two sub-meshes may be already encoded, and a second sub-mesh of the at least two sub-meshes is to be encoded.

At operation 710, a pair of vertices with a minimum cost for prediction may be determined. The first vertex of the pair of vertices may belong to the first sub-mesh and a second vertex of the pair of vertices may belong to the second sub-mesh. In embodiments, the minimum cost for prediction comprises selecting the first vertex from a candidate list, wherein the candidate list comprises pre-determined sub-sampling locations with a bounding box associated with the first sub-mesh At operation 715, the first vertex of the pair of vertices may be set as a predictor vertex to the second sub-mesh to be encoded.

At operation 720, the first vertex of the pair of vertices may be signaled to a dual degree decoder, which may be followed by an encoding of the second sub-mesh in a first encoding order, wherein the second vertex of the pair of vertices is encoded first in the second sub-mesh.

In embodiments, the signaling may include signaling the first vertex via its encoding order in the first sub-mesh; or signaling the first vertex as an offset of a last encoded vertex. In embodiments, a new predictor vertex may be set next to the first vertex; and the new predictor vertex may be signaled with the first vertex of the pair of vertices.

In embodiments, the new predictor vertex may be signaled as an offset based on a distance to a current pivot of the first sub-mesh or the second sub-mesh.

In embodiments, the first sub-mesh among the at least two sub-meshes to encode may be selected using a cost function that is based on a prediction cost between pairs of meshes and a cost of signaling a new predictor vertex symbol. The cost function may be based on a centroid distance between respective pairs of meshes and/or a minimum distance between respective bounding boxes associated with the respective pairs of meshes.

In embodiments, the process 700 may further include determining a remaining predictor vertex for a remaining mesh of the at least two sub-meshes. The remaining predictor vertex may be determined from a pre-determined list, wherein the pre-determined list comprises a first encoded vertex of a previously encoded sub-mesh, a last encoded vertex of the previously encoded sub-mesh, a centroid of the previously encoded sub-mesh, and a center vertex of the previously encoded sub-mesh. The remaining mesh may be encoded based on the remaining predictor vertex.

In embodiments, the process 700 may further include signaling a number of meshes in the at least two sub-meshes using a first number of bits; signaling a first prediction mode of the first sub-mesh using a second number of bits; and signaling a remaining prediction mode of the remaining mesh using a third number of bits, wherein the third number of bits is smaller than the second number of bits.

It may be understood that the process 700 may describe an encoding process, but a person of skill in the art will know that similar operations may be performed in a modified order for a decoding process.

The proposed methods may be used separately or combined in any order. The proposed methods may be used for arbitrary polygon mesh, but even though only a triangle mesh may have been used for demonstration of various embodiments, it will be assumed that an input mesh may contain one or multiple instances, that a sub-mesh is a part of input mesh with an instance or multiple instances, and that multiple instances can be grouped to form a sub-mesh.

The techniques described above, can be implemented as computer software using computer-readable instructions and physically stored in one or more computer-readable media or by a specifically configured one or more hardware processors. For example, FIG. 8 shows a computer system 800 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 8:
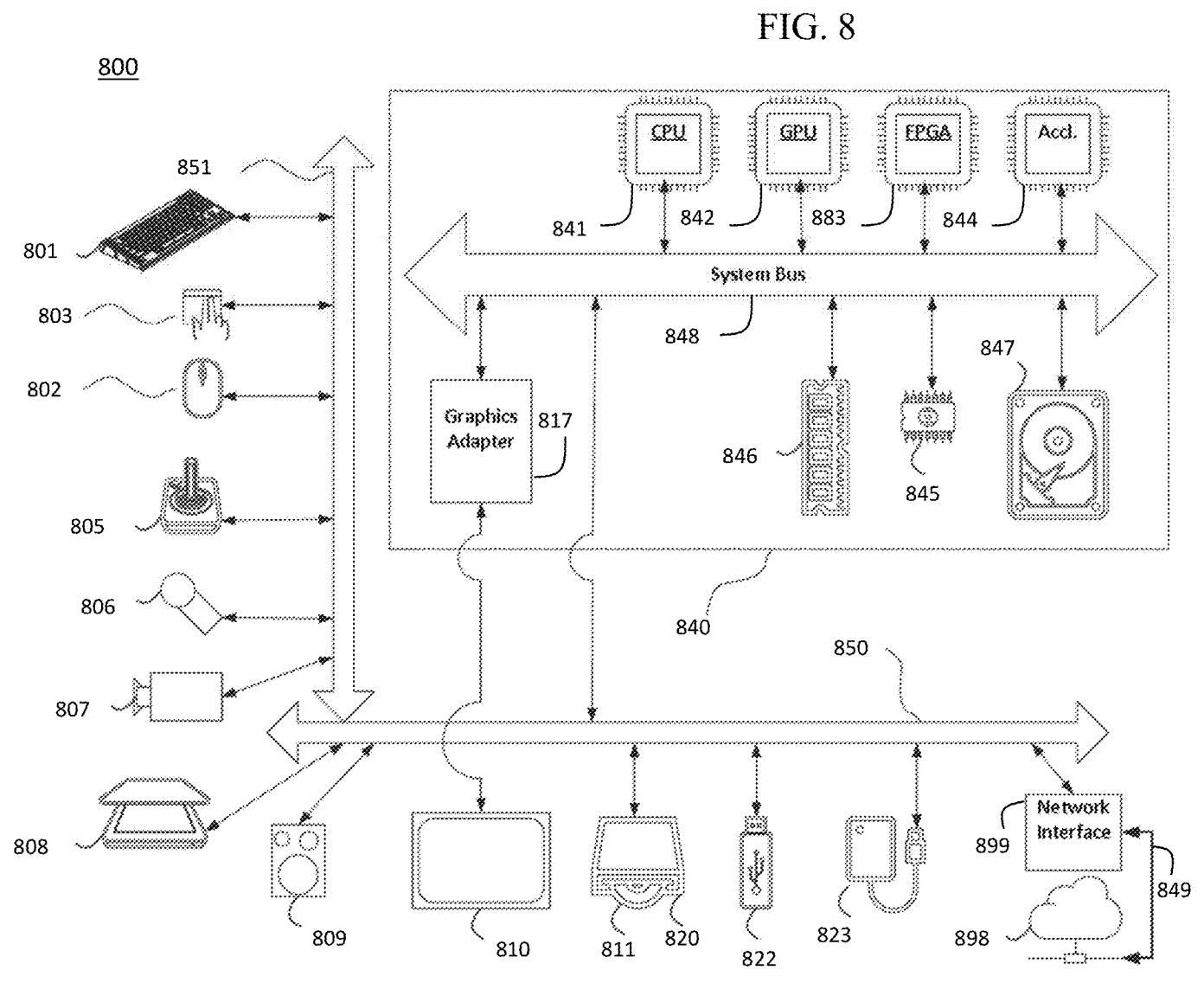

The components shown in FIG. 8 for computer system 800 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 800.

Computer system 800 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 801, mouse 802, trackpad 803, touch screen 810, joystick 805, microphone 806, scanner 808, camera 807.

Computer system 800 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 810, or joystick 805, but there can also be tactile feedback devices that do not serve as input devices), audio output devices (such as: speakers 809, headphones (not depicted)), visual output devices (such as screens 810 to include CRT screens, LCD screens, plasma screens, OLED screens, each with or without touch-screen input capability, each with or without tactile feedback capability some of which may be capable to output two dimensional visual output or more than three dimensional output through means such as stereographic output; virtual-reality glasses (not depicted), holographic displays and smoke tanks (not depicted)), and printers (not depicted).

Computer system 800 can also include human accessible storage devices and their associated media such as optical media including CD/DVD ROM/RW 820 with CD/DVD 811 or the like media, thumb-drive 822, removable hard drive or solid state drive 823, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 800 can also include interface 899 to one or more communication networks 898. Networks 898 can for example be wireless, wireline, optical. Networks 898 can further be local, wide-area, metropolitan, vehicular and industrial, real-time, delay-tolerant, and so on. Examples of networks 898 include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks 898 commonly require external network interface adapters that attached to certain general-purpose data ports or peripheral buses (750 and 851) (such as, for example USB ports of the computer system 800; others are commonly integrated into the core of the computer system 800 by attachment to a system bus as described below (for example Ethernet interface into a PC computer system or cellular network interface into a smartphone computer system). Using any of these networks 898, computer system 800 can communicate with other entities. Such communication can be uni-directional, receive only (for example, broadcast TV), uni-directional send-only (for example CANbusto certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 840 of the computer system 800.

The core 840 can include one or more Central Processing Units (CPU) 841, Graphics Processing Units (GPU) 842, a graphics adapter 817, specialized programmable processing units in the form of Field Programmable Gate Areas (FPGA) 843, hardware accelerators for certain tasks 844, and so forth. These devices, along with Read-only memory (ROM) 845, Random-access memory 846, internal mass storage such as internal non-user accessible hard drives, SSDs, and the like 847, may be connected through a system bus 848. In some computer systems, the system bus 848 can be accessible in the form of one or more physical plugs to enable extensions by additional CPUs, GPU, and the like. The peripheral devices can be attached either directly to the core's system bus 848, or through a peripheral bus 849. Architectures for a peripheral bus include PCI, USB, and the like.

CPUs 841, GPUs 842, FPGAs 843, and accelerators 844 can execute certain instructions that, in combination, can make up the aforementioned computer code. That computer code can be stored in ROM 845 or RAM 846. Transitional data can be also be stored in RAM 846, whereas permanent data can be stored for example, in the internal mass storage 847. Fast storage and retrieval to any of the memory devices can be enabled through the use of cache memory, that can be closely associated with one or more CPU 841, GPU 842, mass storage 847, ROM 845, RAM 846, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 800, and specifically the core 840 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 840 that are of non-transitory nature, such as core-internal mass storage 847 or ROM 845. The software implementing various embodiments of the present disclosure can be stored in such devices and executed by core 840. A computer-readable medium can include one or more memory devices or chips, according to particular needs. The software can cause the core 840 and specifically the processors therein (including CPU, GPU, FPGA, and the like) to execute particular processes or particular parts of particular processes described herein, including defining data structures stored in RAM 846 and modifying such data structures according to the processes defined by the software. In addition or as an alternative, the computer system can provide functionality as a result of logic hardwired or otherwise embodied in a circuit (for example: accelerator 844), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for mesh attribute coding using a dual degree mesh encoder, the method being executed by at least one processor, the method comprising:

receiving at least two sub-meshes, wherein a first sub-mesh of the at least two sub-meshes is previously encoded, and wherein a second sub-mesh of the at least two sub-meshes is to be encoded;

determining a pair of vertices with a minimum cost for prediction, wherein a first vertex of the pair of vertices is a part of the first sub-mesh, wherein a second vertex of the pair of vertices is a part of the second sub-mesh; and setting the first vertex of the pair of vertices as a predictor vertex corresponding to the second sub-mesh to be encoded;

signaling the first vertex of the pair of vertices to a dual degree mesh decoder; and encoding the second sub-mesh by first encoding the second vertex of the pair of vertices in the second sub-mesh.

2. The method of claim 1, wherein the signaling comprises:

signaling the first vertex via its encoding order in the first sub-mesh; or signaling the first vertex as an offset of a last encoded vertex.

3. The method of claim 1, wherein the signaling comprises:

setting a new predictor vertex next to the first vertex; and signaling the new predictor vertex with the first vertex of the pair of vertices.

4. The method of claim 3, wherein the signaling the new predictor vertex comprises:

signaling an offset based on a distance to a current pivot of the first sub-mesh or the second sub-mesh.

5. The method of claim 1, wherein the method further comprises:

selecting the first sub-mesh among the at least two sub-meshes to encode using a cost function that is based on a prediction cost between pairs of meshes and a cost of signaling a new predictor vertex symbol.

6. The method of claim 5, wherein the prediction cost between the pairs of meshes is based on one of:

a centroid distance between respective pairs of meshes; and a minimum distance between respective bounding boxes associated with the respective pairs of meshes.

7. The method of claim 1, wherein the minimum cost for prediction comprises selecting the first vertex from a candidate list, wherein the candidate list comprises pre-determined sub-sampling locations with a bounding box associated with the first sub-mesh.

8. The method of claim 1, wherein the method further comprises:

determining a remaining predictor vertex for a remaining mesh of the at least two sub-meshes, wherein the remaining predictor vertex is determined from a pre-determined list, wherein the pre-determined list comprises a first encoded vertex of a previously encoded sub-mesh, a last encoded vertex of the previously encoded sub-mesh, a centroid of the previously encoded sub-mesh, and a center vertex of the previously encoded sub-mesh; and encoding the remaining mesh based on the remaining predictor vertex.

9. The method of claim 8, wherein the method further comprises:

signaling a number of meshes in the at least two sub-meshes using a first number of bits;

signaling a first prediction mode of the first sub-mesh using a second number of bits; and signaling a remaining prediction mode of the remaining mesh using a third number of bits, wherein the third number of bits is smaller than the second number of bits.

10. An apparatus for mesh attribute coding using a dual degree mesh decoder, the apparatus comprising:

at least one memory configured to store program code; and at least one processor configured to read the program code and operate as instructed by the program code, the program code including:

first receiving code configured to cause the at least one processor to receive at least two encoded sub-meshes;

second receiving code configured to cause the at least one processor to receive a predictor vertex from a dual degree mesh encoder, wherein the predictor vertex is a first vertex of a pair of vertices with a minimum cost for prediction;

first determining code configured to cause the at least one processor to determine a second vertex based on the predictor vertex, wherein the first vertex of the pair of vertices is a part of a first sub-mesh among the at least two encoded sub-meshes, wherein the second vertex of the pair of vertices is a part of a second sub-mesh of the at least two encoded sub-meshes; and first decoding code configured to cause the at least one processor to decode the second sub-mesh by first decoding the second vertex of the pair of vertices in the second sub-mesh.

11. The apparatus of claim 10, wherein the predictor vertex is received as one of:

an encoding order of the predictor vertex in the first sub-mesh; or an offset of a last encoded vertex.

12. The apparatus of claim 10, wherein a new predictor vertex is received with the predictor vertex from the dual degree mesh encoder.

13. The apparatus of claim 12, wherein the new predictor vertex is received as an offset based on a distance to a current pivot of the first sub-mesh or the second sub-mesh.

14. The apparatus of claim 10, wherein the program code further comprises:

third receiving code configured to cause the at least one processor to receive a remaining predictor vertex for a remaining mesh of the at least two encoded sub-meshes, wherein the remaining predictor vertex is determined from a pre-determined list comprising a first encoded vertex of a previously encoded sub-mesh, a last encoded vertex of the previously encoded sub-mesh, a centroid of the previously encoded sub-mesh, and a center vertex of the previously encoded sub-mesh; and second decoding code configured to cause the at least one processor to decode the remaining mesh based on the remaining predictor vertex.

15. The apparatus of claim 14, wherein the program code further comprises:

fourth receiving code configured to cause the at least one processor to receive a number of meshes in the at least two encoded sub-meshes using a first number of bits;

fifth third receiving code configured to cause the at least one processor to receive a first prediction mode of the first sub-mesh using a second number of bits; and sixth receiving code configured to cause the at least one processor to receive a remaining prediction mode of the remaining mesh using a third number of bits, wherein the third number of bits is smaller than the second number of bits.

16. A non-transitory computer-readable medium storing instructions, the instructions comprising: one or more instructions that, when executed by one or more processors of a device for mesh attribute coding, cause the one or more processors to:

perform a conversion between a visual media file and a bitstream of a visual media data according to a format rule, wherein the bitstream comprises at least two sub-meshes, a first sub-mesh of the at least two sub-meshes previously converted, wherein the bitstream comprises a predictor vertex to a second sub-mesh to be converted, wherein the predictor vertex is a first vertex of a pair of vertices with a minimum cost for prediction, wherein the first vertex of the pair of vertices is a part of the first sub-mesh among the at least two sub-meshes, wherein a second vertex of the pair of vertices is a part of the second sub-mesh of the at least two sub-meshes; and encoding or decoding the second sub-mesh using the second vertex of the pair of vertices.

17. The non-transitory computer-readable medium of claim 16, wherein the bitstream comprises the predictor vertex as one of:

an encoding order of the predictor vertex in the first sub-mesh; or an offset of a last encoded vertex.

18. The non-transitory computer-readable medium of claim 16, wherein the bitstream comprises a new predictor vertex along with the predictor vertex.

19. The non-transitory computer-readable medium of claim 18, wherein the new predictor vertex is an offset based on a distance to a current pivot of the first sub-mesh or the second sub-mesh.

20. The non-transitory computer-readable medium of claim 16, wherein the bitstream further comprises a remaining predictor vertex for a remaining mesh of the at least two sub-meshes, wherein the remaining predictor vertex is determined from a pre-determined list comprising a first encoded vertex of a previously converted sub-mesh, a last encoded vertex of the previously converted sub-mesh, a centroid of the previously converted sub-mesh, and a center vertex of the previously converted sub-mesh; and wherein the encoding or decoding further comprises encoding or decoding the remaining mesh based on the remaining predictor vertex.

\* \* \* \* \*